Feb. 2, 1932.　　　　M. HOUDAILLE　　　　1,843,603
HYDRAULIC SHOCK ABSORBER
Filed July 30, 1927　　　9 Sheets-Sheet 3

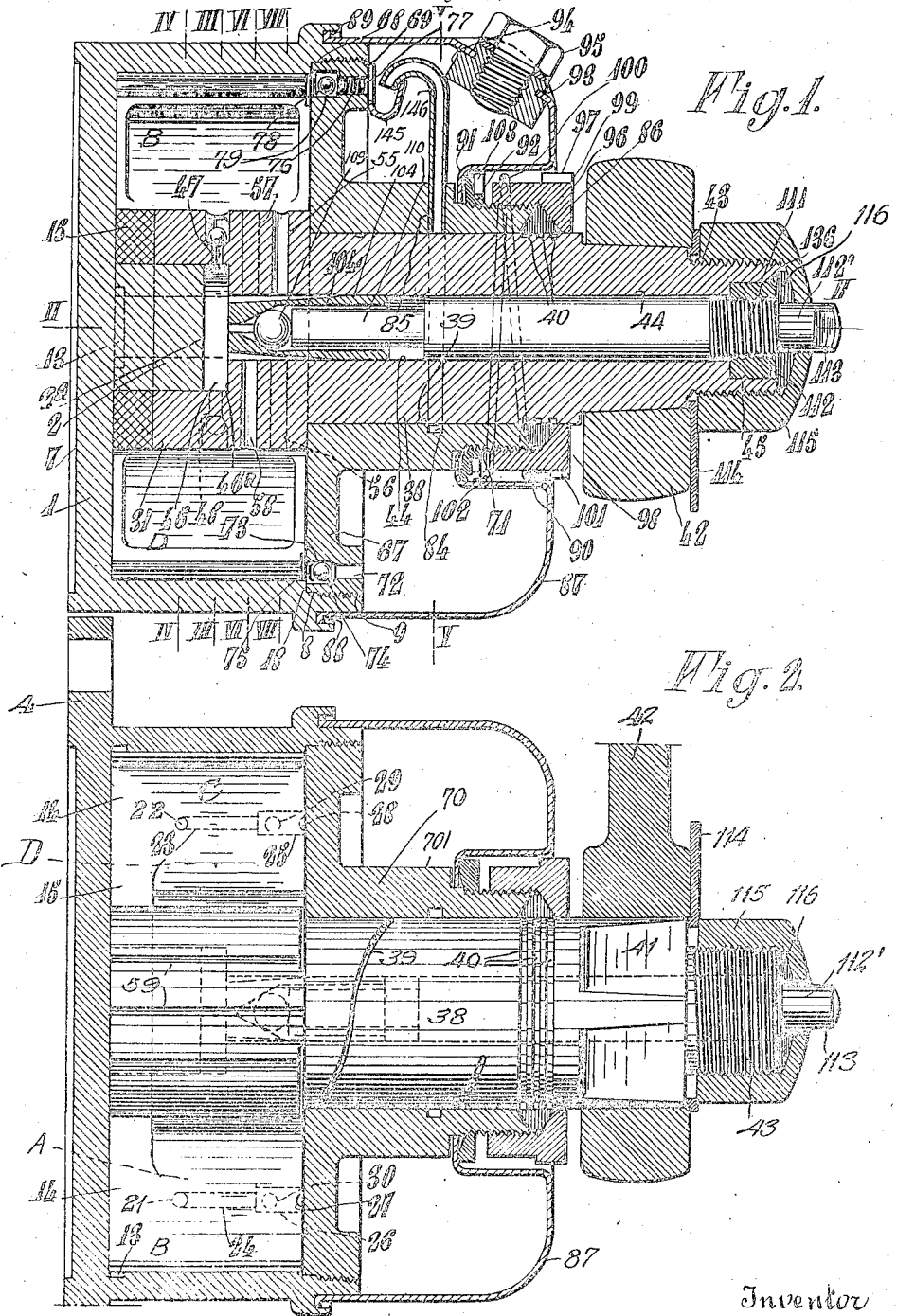

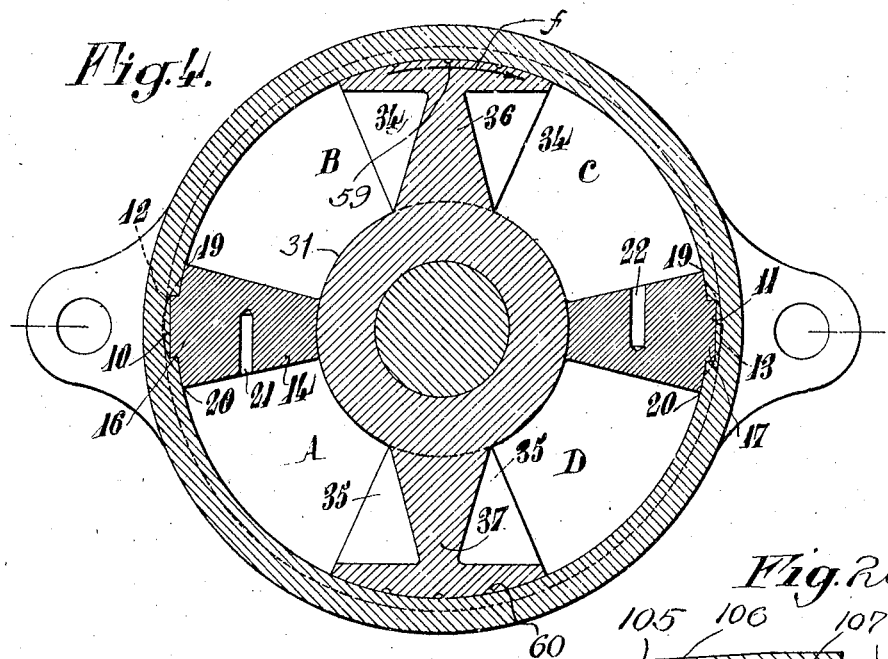
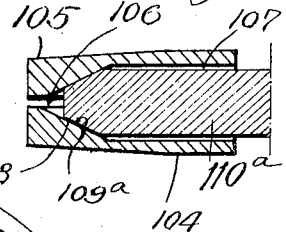
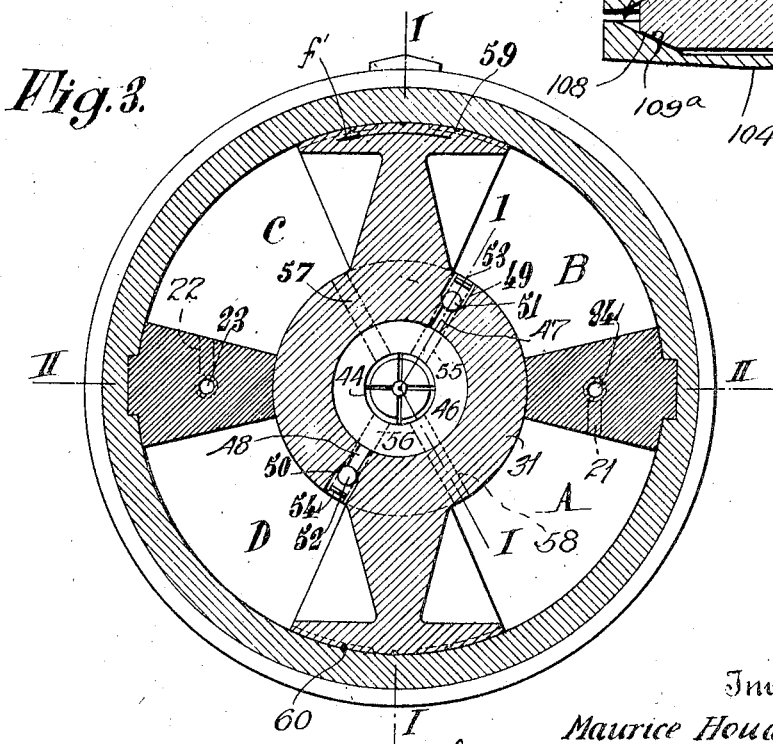

Inventor
Maurice Houdaille
By his Attorneys
Hoguet & Neary

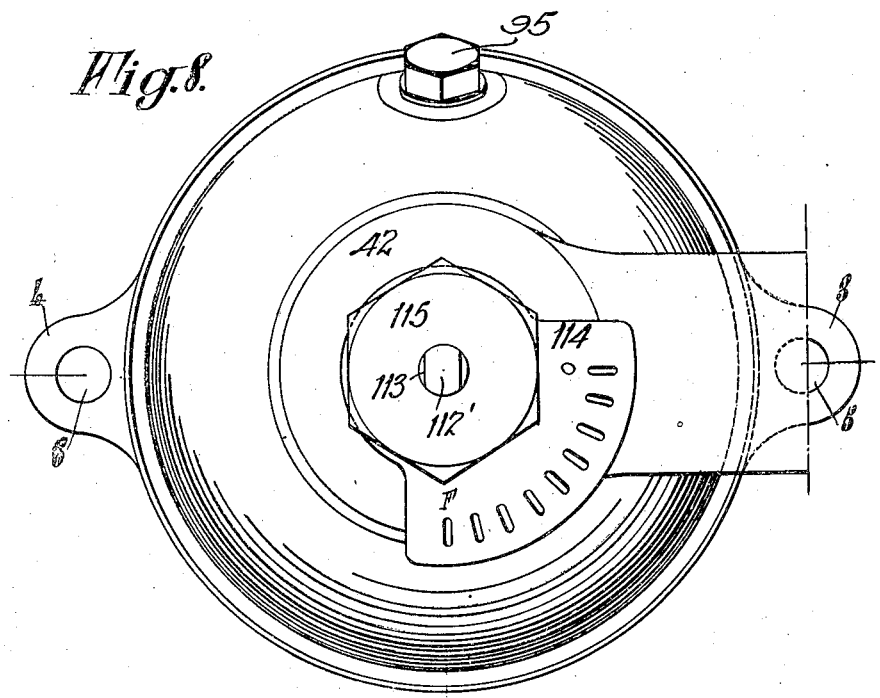
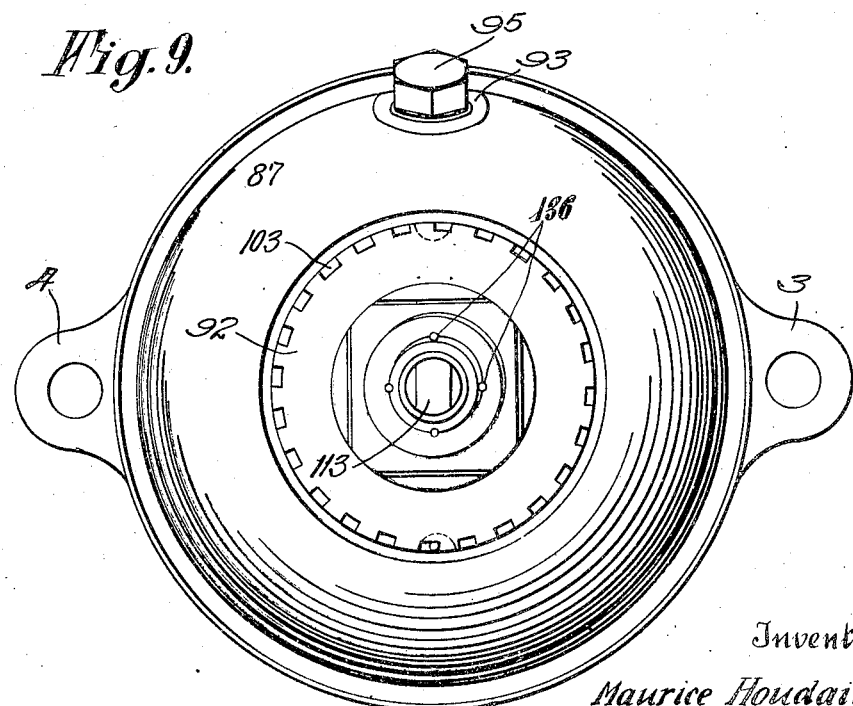

Feb. 2, 1932.  M. HOUDAILLE  1,843,603
HYDRAULIC SHOCK ABSORBER
Filed July 30, 1927  9 Sheets-Sheet 5
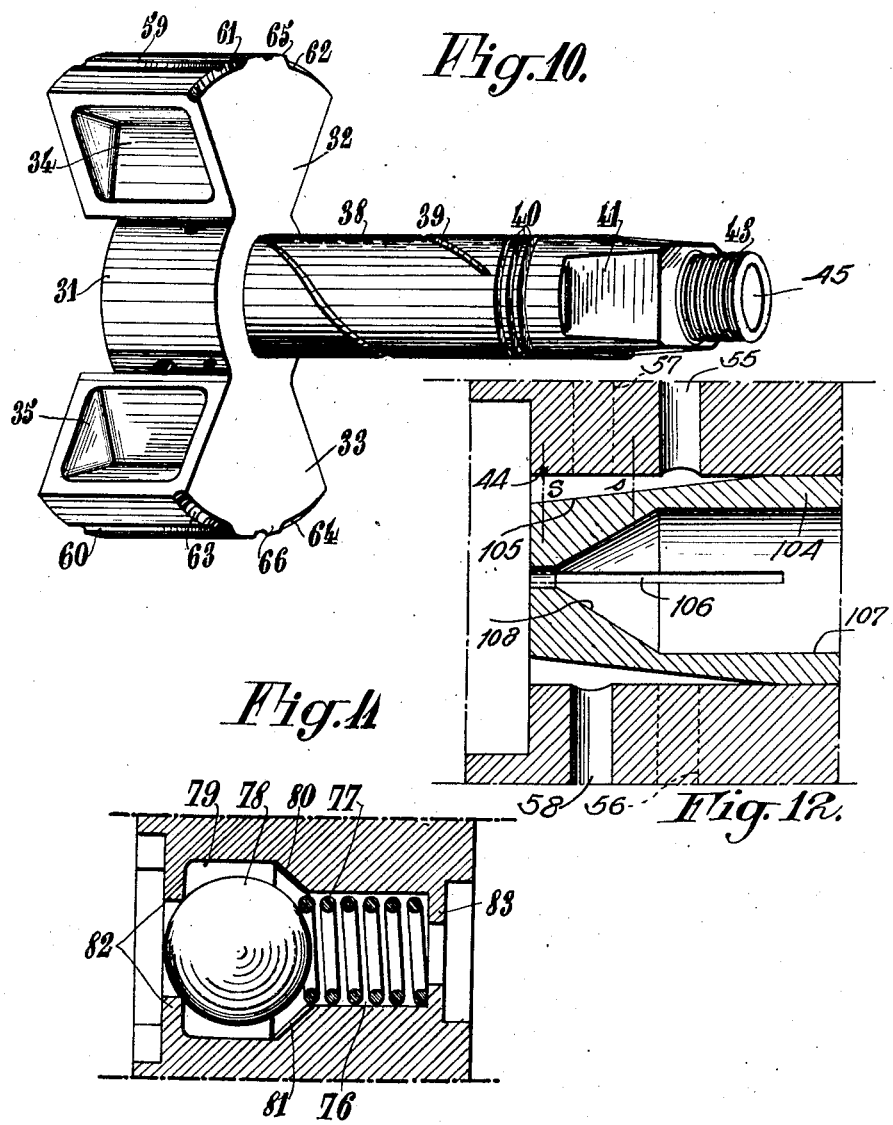
Inventor
Maurice Houdaille
By his Attorneys
Hoguet & Neary

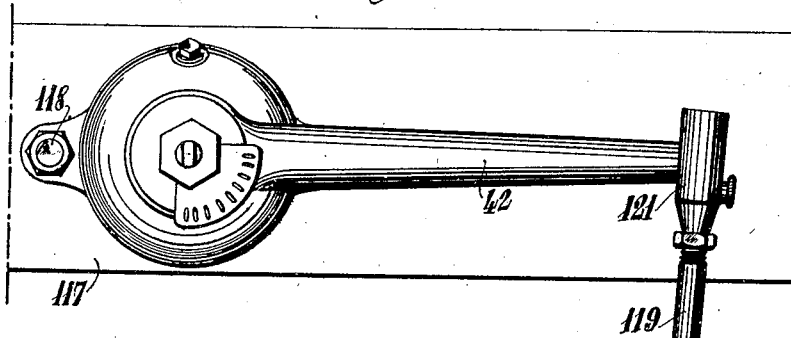
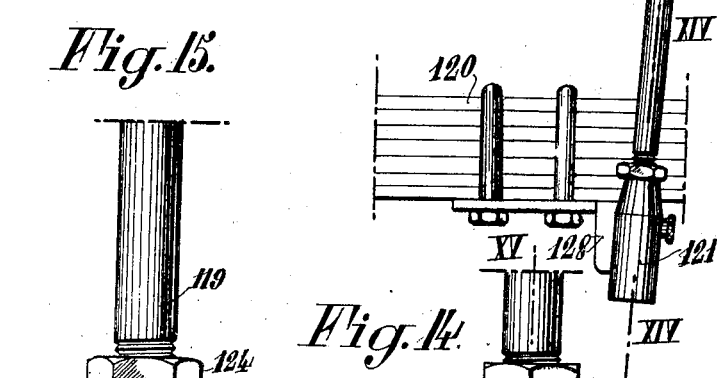
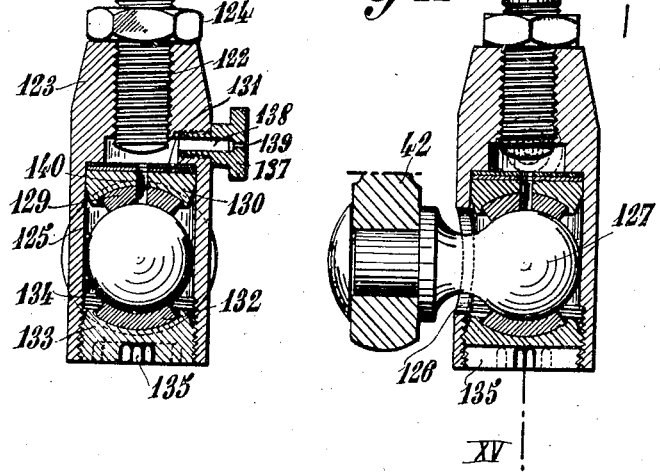

Feb. 2, 1932. M. HOUDAILLE 1,843,603
HYDRAULIC SHOCK ABSORBER
Filed July 30, 1927 9 Sheets-Sheet 7

Inventor
Maurice Houdaille
By his Attorneys
Hoguet & Neary

Feb. 2, 1932.   M. HOUDAILLE   1,843,603
HYDRAULIC SHOCK ABSORBER
Filed July 30, 1927   9 Sheets-Sheet 8

Inventor
Maurice Houdaille
By his Attorneys
Hoguet & Neary

Feb. 2, 1932.  M. HOUDAILLE  1,843,603
HYDRAULIC SHOCK ABSORBER
Filed July 30, 1927  9 Sheets-Sheet 9
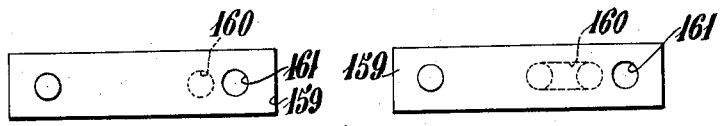
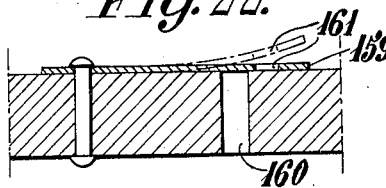 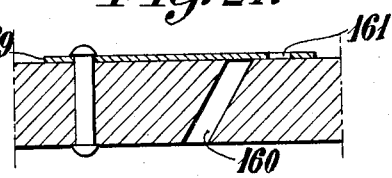
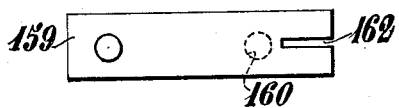 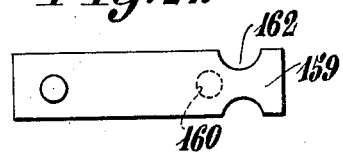
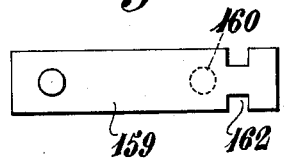 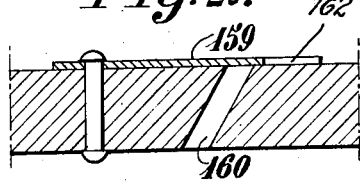
Inventor
Maurice Houdaille
By his Attorneys
Hoguet & Neary Patented Feb. 2, 1932

1,843,603

UNITED STATES PATENT OFFICE

MAURICE HOUDAILLE, OF LEVALLOIS-PERRET, FRANCE, ASSIGNOR TO HOUDE ENGINEERING CORPORATION, A CORPORATION OF NEW YORK

HYDRAULIC SHOCK ABSORBER

Application filed July 30, 1927, Serial No. 209,417, and in France August 3, 1926.

The present invention relates in general to hydraulic vibration and shock absorbers, and more particularly to hydraulic shock absorbers usually employed on motor vehicles, although this invention is not limited to this category of shock absorbers.

The improvements forming the subject-matter of the invention are adapted to improve the operation of hydraulic shock absorbers and to increase their efficiency.

Another object of the invention is to regulate the braking of the rebounding of the springs and regulate the braking of the sinking of the said springs, whilst, up to now, alone the braking of the rebounding could be regulated.

A further object of the invention is to permit of simultaneously regulating the braking of the rebounding of the springs and the braking of the sinking of the springs, by means of a single adjusting member.

A still further object of the invention is to permit a regulation of the braking of the rebounding of the springs and a regulation of the braking of the sinking of the said springs, such that these two braking values remain in a determined ratio.

A further object of the invention is to permit the use of rotary pistons having a large surface of contact with the casing, without hindering the operation of the air inlet valves and of the air exhaust valves.

A further object of the invention is to obtain a better fluid-tightness between the chambers separated by the rotary piston and by the fixed shutter.

The accompanying drawings illustrate a form of construction of the invention, but it is to be understood that this form of construction is not restrictive and is described by way of example only.

Fig. 1 is a sectional elevation of the shock absorber, according to line I—I of Fig. 3.

Fig. 2 is a sectional view of the shock absorber, according to line II—II of Figs. 1 and 3.

Fig. 3 is a sectional view made according to line III—III of Fig. 1.

Fig. 4 is a sectional view made according to line IV—IV of Fig. 1.

Fig. 8 is a front view of the shock absorber.

Fig. 9 is a front view, when the lever and the locking nut are removed.

Fig. 10 is a perspective view of the rotary piston.

Fig. 11 is a sectional view, on a large scale, of the air exhaust valve.

Fig. 12 is a sectional view, on a large scale, of the regulating device.

Fig. 13 shows, in front view, the method of assembling the shock absorber.

Fig. 14 is a section made according to line XIV—XIV of Fig. 13.

Fig. 15 is a section made according to line XV—XV of Fig 14.

Figure 5:
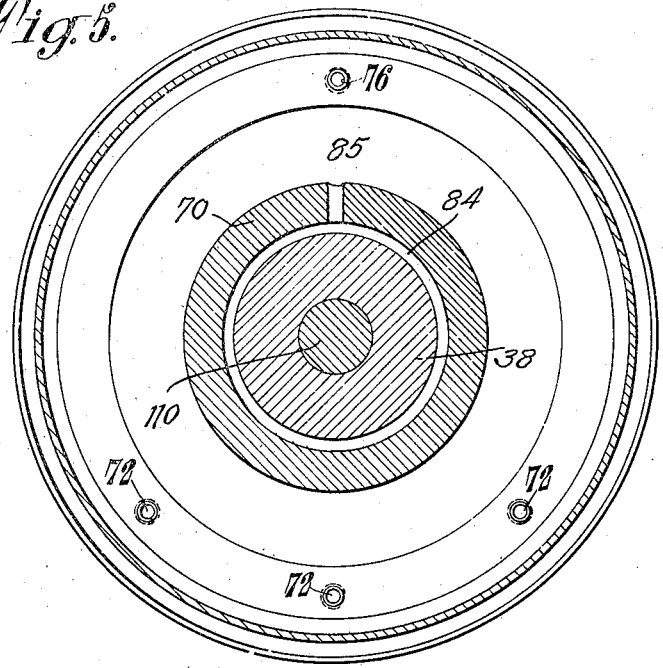
Fig. 5 is a sectional view made according to line V—V of Fig. 1.

Figs. 16 to 20 relate to modifications.

Figs. 21 to 28 illustrate various modifications of a detail of construction.

Fig. 29 is a sectional view of a modified form of the means for adjusting the obturator.

In the form of construction illustrated in the drawings, the shock absorber comprises a casing 1. This casing has a cylindrical shape and is internally recessed so as to constitute a chamber, also cylindrical, having at its center a boss 2, which is also cylindrical. This boss serves to ensure the exact centering of the fixed shutter and of the rotary piston, as will be explained later on. The casing 1 is provided, on either side, with side lugs 3 and 4, perforated with holes 5 and 6; these perforated lugs serve to ensure the fixation of the casing 1 on the member the vibrations of which are to be deadened relatively to another member. In a motor vehicle, the casing 1 will therefore be secured either on the chassis, or on an axle.

On its rear face, which fits on the member against which it is secured, the casing 1 is provided with a small recess 7 which facilitates the machining of the parts adapted to bear on the member receiving the shock absorber. At its front part, the casing 1 has a cylindrical centering bearing portion 8 and a screw threaded portion 9. Moreover, at 10 and 11 are provided diametrically opposed mortices adapted to receive the fixed shutter as will be explained later on. For facilitating the machining of these mortices, on the side wall of the casing 1 and near the bottom are provided circular notches 12 and 13, obtained for instance by means of a milling cutter and which form the issue for the mortising tool when the mortices 10 and 11 are being made.

Within the casing 1 is arranged the fixed shutter partition or abutment 14. This fixed shutter has a central part 15 centrally bored for fitting on the boss 2 of the casing 1. The shutter 14 has, moreover, side flanges terminating in tenons 16 and 17 entering the mortices 10 and 11. The side flanges 16 extend to the bottom 18 of the circular centering part 8 of the casing 1. These flanges have, in cross section, the shape of a trapezium, so that they are in contact with the circular wall of the casing 1 according to a zone 19—20 of greater width than the width of the circular notches 12 and 13. In this way, the fluid-tightness between the chambers formed by the shutter 14 in the casing 1 is sufficiently ensured, which was not the case in apparatus in which the shutters 14 had the same width as the tenons 16 and 17. The method of assemblage through the fixed shutter 14 ensures therefore a great simplicity of manufacture and assemblage. In both flanges of the shutter 14 are formed horizontal blind holes 21 and 22, these holes opening on opposite sides and so that the said holes open in chambers which, as explained later on, are to be under compression upon sinking of the spring. In the holes 21 and 22 open perpendicular holes 23 and 24 terminating on the upper face of the shutters 14 in enlargements 25 and 26. The upper face of the flanges 14 is grooved at 27 and 28 for forming conduits which open in the chamber opposite those where open the channels 21 and 22; that is to say if the channel 21 opens in the chamber A, as illustrated in Fig. 4, the corresponding channel 27 opens in the chamber B, the channel 22 opens in the chamber C contiguous to the chamber B, and the channel 28, corresponding to the channel 22, opens in the chamber D contiguous to the chamber A. Within these enlargements 25 and 26, are arranged balls 29 and 30 which act as valves, as will be explained later on.

In the boss 2 of the casing 1 and between the fixed shutter 14 is centered the rotary piston 31. This piston is particularly shown clearly in Fig. 10. The said rotary piston has two paddles or vanes 32 and 33, these vanes widening towards their ends, so as to present a large surface of contact with the inner wall of the casing 1. Preferably, and as illustrated, for diminishing the weight, the vanes 32 and 33 are recessed, as shown at 34 and 35, a thin web only being provided at 36 and 37 for separating the chambers B and C on the one hand, and the chambers A and D on the other hand.

From the rotary piston 31 extends forwardly a cylindrical shaft 38 provided on its surface with two helical grooves 39 the function of which will be indicated later on. At its end, the shaft 38 is provided with three circular slots 40 for fluid-tightness and, further on, the shaft 38 is cut, at 41, for presenting a prismatic cross section permitting its actuation by a lever 42. Finally, the shaft 38 terminates in a screw threaded portion 43. The whole of the rotary piston is perforated with an axial cylindrical hole 44 enlarged at the front part, at 45. At the rear part, the hole 44 opens in a hole 46, of greater diameter, which permits the centering of the rotary piston on the boss 2, a space being provided between the front part 2a of the boss 2 and the bottom 46a of the hole 46. In this space open two opposite channels 47 and 48 which form an extension of each other and lead, on the one hand, in diametrally opposite chambers B and D. The holes 47 and 48, at the place where they open in the chambers B and D, widen at 49 and 50, for each receiving a ball 51 and 52 acting as a valve. The balls 51 and 52 are prevented from coming out by ledges 53 and 54 obtained by giving with a punch a blow on the edges of the holes 49 and 50, when the balls 51 and 52 have been placed in position.

On the other hand, in the hole 44 open two other channels 55 and 56, leading also into the chambers B and D. Finally between the holes 55 and 47, on the one hand, and 56 and 48, on the other hand, two other channels in alignment 57 and 58 open in the hole 44 as well as in the chambers A and C.

On the faces of the rotary piston which are in contact with the cylindrical wall of the casing 1, are provided grooves for fluid tightness, as shown in 59 and 60, these grooves being preferably made parallel to the axis of the cylindrical surface and, on the front edge of the said rotary piston, on either side of the middle plane, are provided, for the purpose indicated later on, grooves or bevels shown at 61, 62, 63 and 64. These grooves leave between them non bevelled spaces 65 and 66.

The casing 1 is closed, at its front part, by a cover 67 having a cylindrical part 68 adapted to fit exactly in the cylindrical part 8 of the casing 1 and to ensure a perfect centering; moreover, the cover 67 is provided, at 69; with a screw threaded portion screwing in the internally screw threaded portion 9 of the casing.

The cover 67 extends in an axial boss 70 which presents, at 701, a prismatic portion permitting to ensure an energetic screwing of the cover 67 on the casing. The boss of the cover 67 terminates in a screw threaded portion 71.

At the lower part of the cover 67, are formed three holes or channels 72 which are enlarged, at 73, inwardly to the casing, and each receiving a ball 74 acting as a valve, this ball being prevented from coming out by ledges 75 obtained by giving a blow with a punch on the edges of the hole 73. It is to be understood that there might be a number of channels 72 other than three, that is to say a greater or a smaller number. At the upper part is provided an orifice 76 within which is arranged a returning spring 77 for a ball 78 acting as a valve, this ball being arranged within a hole 79, of larger diameter, in the channel 76 and this channel being provided with a seat 80 for the ball 78. Very small grooves 81 are provided in this seat 80, so that, when the ball 78 presses on the seat 80, the grooves 81 form capillary channels. The ball 78 is prevented from coming out by ledges 82 obtained by giving a blow with a punch on the edges of the hole 79. Likewise, the spring 77 takes a bearing at 83 on a flange obtained by giving a blow with a punch on the edges of the hole 76.

The axial boss 70 of the cover 67 is bored for fitting on the shaft 38 of the rotary piston 31, and this bore is provided, at 84 with a circumferential groove in which opens a radial hole 85. Provisions are made for the hole 85 to vertically open at the upper part of the boss 70. At its front part, the axial boss of the cover 67 presents a conical concave part 86 which, upon assemblage, is slightly behind the fluid-tight grooves 40 of the axis 38.

A cap 87 is fitted on the casing 1; this cap 87 bears on the bottom of a groove 88 formed on the front face of the casing 1, by a bent down edge 89. Moreover, the part 87 is centrally provided with a pressed cavity 90 the ledge 91 of which bears against the plane portion of the axis of the cover 67, between the prismatic portion 70 and the screw threaded portion 71; a nut 92, screwing on the said portion 71, ensures the rigid and hermetic fixation of the cap 87 on the casing 1. At 93, the cap 87 presents a flat portion, on which is a beaded reinforcing member 94; this reinforcing member 94 is internally screw threaded for receiving a screw plug 95.

A stuffing box gland 96 provided with teeth 97 on its periphery, is screwed on the screw threaded portion 71 of the cover 67, so as to compress a fluid-tight packing 98 between the inclined face 99 of the said gland 96 and the inclined face 86 of the axial boss of the cover 67. A spring 100, wound in a helix, presents at its ends, curved parts 101 and 102 which engage, one with the teeth 97 and the other in holes 103 formed in the nut 92 for permitting to screw the same. This spring 100 constitutes a brake for the gland 96.

Within the hole 44 and at its rear end is arranged a sleeve 104 which is secured within the hole 44. This sleeve presents a conical part 105 having a suitably chosen angle at the apex and, in order that it may be expansible or extensible, saw cuts 106 are formed therein. The sleeve 104 is provided with a hole 107 which terminates by a conical part 108. On this conical part 108 presses a ball 109 on which bears the end of a rod 110 guided in the hole 44. Instead of making member 109 separate from the rod 110 and in the form of a ball the same may be formed integral thereon and in the form of a cone, as shown at 109$^a$ and 110$^a$ in Fig. 29, or of any other suitable form. At its front end, the rod 110 is screw threaded in 111, this screw threaded portion engaging with a corresponding screw threaded portion of a ring 112 which is placed in the enlargement 45 of the shaft 38. Finally, the rod 110 terminates in a head 112' having two flat portions 113.

A small graduated plate 114 fits on the end of the shaft 38 and is held in place, as well as the lever 42, by a nut 115 which screws on the screw threaded portion 43 of the shaft 38. The nut 115 is in the shape of a blind nut, but leaves an orifice for the passage of the head 112'. A fluid-tight packing 116 is so arranged that it can be clamped by the nut 115.

The operation of the device thus described is as follows:

It will be assumed that, initially, the chambers A, B, C, D are filled with a suitable liquid and, for instance, with castor oil. It will be also assumed that, by unscrewing the screw threaded plug 95, the cap 87 has been partially filled with the same liquid.

It will be moreover assumed that the body 1 of the shock absorber is secured on a longitudinal frame 117 of a motor vehicle, for instance by means of bolts 118 and that the lever 42 is connected, by a link 119 having ball and socket connection at its ends, to the axle or to the springs 120. The ball and socket connection 121 terminating the link 119 are constituted in the following manner: the link 119 is screw threaded at 122 and on this screw threaded portion is mounted a ball box 123, a nut 124 serving to ensure a rigid fixation. The ball box 123 is perforated with an axial hole 125 in which opens a side hole 126 permitting the introduction of the ball 127, which depends either of the lever 42, or of a support 128 integral with the spring 120. The ball 127 rests on the one hand on a cup 129 made of fiber or other similar material, which cut is arranged in a smooth bearing disc 130, abutting against the bottom of the bore 125 through the medium of washers 131. On the other side, the ball 127 bears against another cup 132 made of fiber or similar material, the whole being held by a screw threaded bearing disc 133 screwing in a screw threaded portion 134 of the bore 125. For permitting its screwing, the said bearing disc 133 has several grooves such as 135.

In these conditions, it is obvious that any displacement on the axle relatively to the chassis has the effect of producing, through the medium of the ball 119 and of the lever 42, the rotation of the rotary piston of the shock absorber.

It will be assumed for instance that the axle tends to move towards the chassis, that is to say the springs collapse or sink. In the shock absorber such as has been described, and according to what has been previously set forth, it is desired that the braking of the sinking of the springs should be less intense than the braking of the rebounding, these two brakings being realized in a given ratio.

Figure 6:
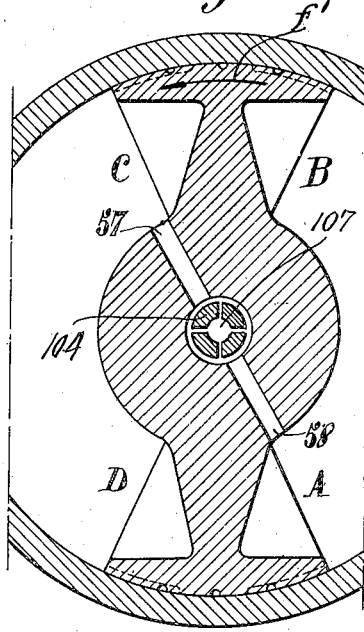
Fig. 6 is a partial sectional view made according to line VI—VI of Fig. 1.
Figure 7:
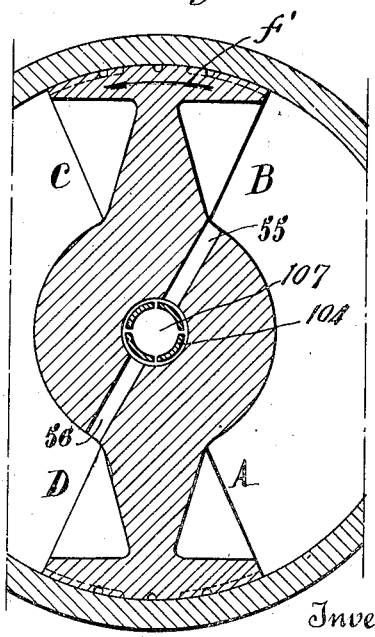
Fig. 7 is a partial sectional view made according to line VII—VII of Fig. 1.

The lever 42, upon sinking of the springs, cause the rotary piston to rotate in the direction of the arrow $f$ of Fig. 4, this corresponds to the direction indicated by the arrow $f^1$ for Figures 3, 6 and 7 which are seen from another side than Fig. 4. It then happens that the liquid contained in the chambers A and C is subjected to a compression, whilst the liquid contained in the chambers B and D is subjected to a partial vacuum. The liquid contained in the chambers A and C finds two different issues: first, from the chamber A towards the chamber B, through the channels 21, 24 and 27; then, from the chamber C towards the chamber D, through the channels 22, 23 and 28. Then from the chamber A towards the hole 46, through the channel 58, and from the chamber C towards the hole 46, through the channel 57; finally, from the chamber 46, towards the chambers B and D, through the orifices 47 and 48.

In other words, for going, for instance, from the chamber A to the chamber B, the liquid passes both through the path 21—24—27 and, on the other hand, through the path 58—46—47. It is to be noted that, for this latter path, the liquid passes between the outer conical wall 105 of the sleeve 104 and the inner bore 44 through a section indicated at S.

The flow of the liquid, as is well known, determines a certain braking action. This braking action absorbs a portion of the energy of the shock. It is so much the more energetic as the pressure exerted on the liquid is greater, that is to say the intensity of the shock is greater. The said braking acts therefore for relieving the springs in any circumstances.

When the lever 42 rotates in reverse direction, under the action of the relaxation of the springs 120, the chambers B and D are then placed under compression, whilst the chambers C and A are placed under partial vacuum, this having for result to apply the valves 29 and 30, as well as the valves 51 and 52, upon their seats. The liquid, issuing from the chambers B and D, finds only the following path: from the chamber B, through the channel 55 and the section of passage $s$ between the conical wall 105 and the hole 44, to the hole 57 leading into the chamber C; and from the chamber D, through the hole 56 and section of passage $s$, to the hole 58 leading into the chamber A.

Consequently, it will be seen that the section of passage offered to the liquid is much more reduced than in the preceding case. Now, it is well known that a hydraulic braking is so much the more energetic as the section of passage of the liquid is more reduced, and as the pressure exerted on the liquid is greater. Consequently, the braking effected will be much more intense, during the relaxation of the springs, than during their compression.

For effecting the regulation of the braking in the direction of the relaxation of the springs as well as in the direction of compression, the rod 110 is acted upon by means of a suitable wrench fitting on the flat parts 113 of the head 112′, so as to drive in the said rod 110 by screwing it, or to unscrew it. In the first case, that is to say when the rod 110 is screwed, the ball 109 presses upon the conical surface 108 of the sleeve 104 and, as the latter is radially slotted, this pressure exerted by the ball 109 has for effect to determine an expansion of the sleeve 104, that is to say to move the conical surface 105 towards the cylindrical surface of the hole 44.

In the other case, that is to say when the rod 110 is unscrewed, the sleeve 104 will contract, so that the conical surface 105 will move away from the cylindrical surface of the hole 44.

Consequently, it will be possible in this way to cause the sections of passages S and $s$ to vary, at will. But, it is to be noted that this variation will always take place so that the ratio $$\frac{S}{s}$$

is maintained constant. In this way, the proportionality will be maintained between the braking of the sinking of the springs and the braking of the rebounding, the braking exerted by the flow through the orifices 23—24 of the fixed shutter representing only a minimum which must be maintained in any circumstances. Moreover, if desired, the braking exerted by the passage of the fluid through orifices provided in the shutter can be done away with.

It is to be mentioned that, upon sinking of the springs, the liquid coming from the chambers A and C and passing through the holes 58 and 57, can also pass through the section $s$ for entering the chambers B and D through the holes 55 and 56. But, in the reality, the resistance to the flow by the section $s$, is much greater than that offered by the channels 47 and 48 after the section S, so that, practically, a very small quantity of liquid only passes in this case through the section s.

It has been found, in practice, that, by these means, a proportionality approximately constant is obtained between the braking of the rebounding and the braking of the sinking of the springs, whatever may be the adjustment. This result is quite particular to the invention and, to the best of the applicant's knowledge, it has not yet been obtained up to now.

In case leakage of liquid, owing to a considerable pressure taking place in the shock absorber, would occur along the shaft 38, this leakage would be collected by the helical groove 39 and, consequently, would come to the groove 84 of the cover 67, which groove 84 is in communication, through the orifice 85, with the chamber formed by the casing 87. Consequently, the leakage of liquid along the axis of rotation of the rotary piston is thus recovered.

Moreover, when leakage occurs, one at least of the valves 74 of the orifices 72 is opposite a chamber which is placed under partial vacuum. It is for obtaining this result that, certainly, one of these valves is in front of a chamber placed under partial vacuum that the grooves 61—62—63—64 are provided on the rotary piston, so that the width of this piston, concerning the orifices 72, is reduced to the parts 65 and 66. Owing to the partial vacuum which occurs in one of the chambers A and D and owing to the lack of liquid due to leakage, the valve 74 moves away from its seat and allows the liquid contained in the casing 87 to enter the chamber placed under partial vacuum, the leakage being recovered as previously explained.

The air which might be mixed with the operating liquid must be evacuated for avoiding the formation of an emulsion completely modifying the characteristic of shock absorption; this result is obtained by the air exhaust valve 78. This valve during the compression stage, bears on the seat 80, so that the liquid contained in the chamber placed under compression cannot escape, the capillary channels 81 having a cross section much too reduced for the viscosity of the liquid. On the contrary, the air can escape through these channels 81. The spring 77 is adapted to facilitate the unseating of the valve, particularly in the period of rest and accessorily during the period of operation in the partial vacuum stage.

In the improbable case in which a leakage of liquid would not have been collected at 85, the fluid-tight packing 98 has been provided, which completely stops any leakage to the exterior. In practice, these arrangements have given the best results as no leakage whatever has taken place.

A difficulty had arisen for the assemblage of the rod 110. In fact, it is necessary that this rod initially occupies, in the "open" position for instance, a well determined situation relatively to the small plate 114, so that the user may visually determine the adjustment effected. This difficulty has been avoided by the use of the ring 112. In fact, for the assemblage the rod 110 is arranged in the suitable initial position, then the ring 112 and the rod 110 are rotated at the same time and, when the suitable position is reached, the said ring 112 is definitively immobilized for instance by center-marks at 136, as clearly shown in Fig. 9.

For the lubrication of the balls, a lubricating bolt 137 is provided for lubrication under pressure. This lubricating bolt is internally perforated with a hole 138 opening to the exterior through an orifice 139 of very small diameter and of small length. An orifice of such small diameter is adopted for the reason that, by this means, it is possible to do away with the valve usually employed in the lubricating plugs of this type. The main object of this valve is to prevent the entrance of dust and also the return of the lubricant. A hole of very small diameter gives substantially the same results, as its very small cross section does not practically permit the entrance of dust and, moreover, it offers a resistance to the flow sufficiently high for preventing the issue of the lubricant. The cups 129 and bearing discs 130 are preferably perforated, as shown at 140, for the flowing away of the lubricant.

Figure 16:
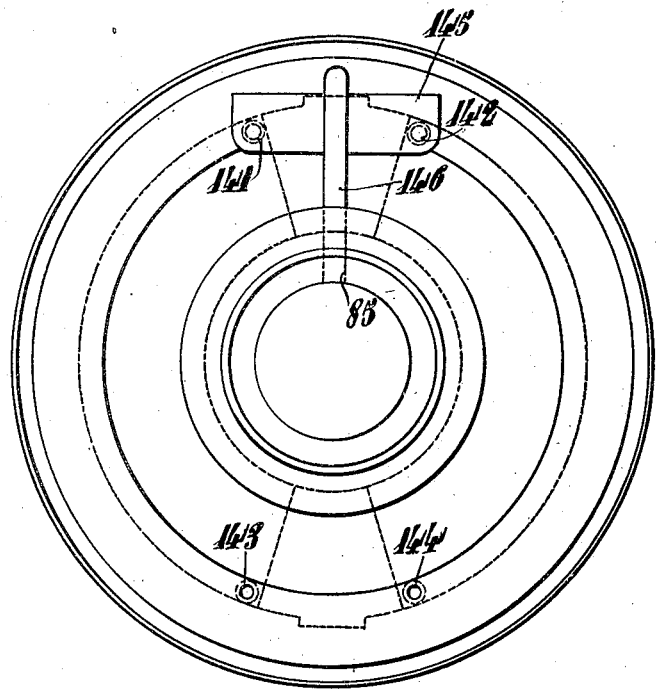
Figure 17:
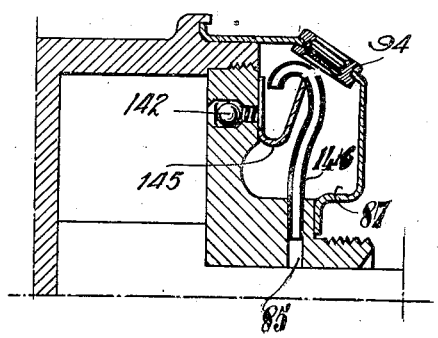

Figs. 16 and 17 illustrate a constructional modification for the various admission and air exhaust valves. In the case illustrated, the shutter is vertically arranged and valves, ball valves for instance, are arranged at 141—142—143 and 144 in the four corresponding angles. In front of the upper valves, which can be in any number and are substantially similar to 78 (they can be provided or not with balls and springs) is arranged a small trough 145 in which leads a tube 146 secured in the hole of the recovery device 85, which is thus directly fed, the valves opening in the trough above which preferably opens the plug 95 in order to first ensure the filling up to the trough. It will be easily understood that the valves are constantly flooded as soon as the recovery device begins to supply liquid, the overflow from the trough then entering the casing.

The form and position of the tube leading to the recovery device to the trough has been shown by way of example only, but this tube can be otherwise formed and also be placed in other positions. When the shutter is horizontal as in Figs. 1 and 4, the arrangement shown in Fig. 18 can be used. In this case, the trough 145, arranged at the level of the air valve or valves 78, communicates with secondary troughs 146ª and 147 arranged at the level of the valves 148—149—150—151, corresponding to the angles of the shutter of the box, by means for instance of the secondary tubes 152 and 153 which serve as overflow, for the trough 145, but might quite as well start directly from the tube 146 and, in its turn, the overflow of the troughs 146 and 147 enters the compensating tank.

Figure 19:
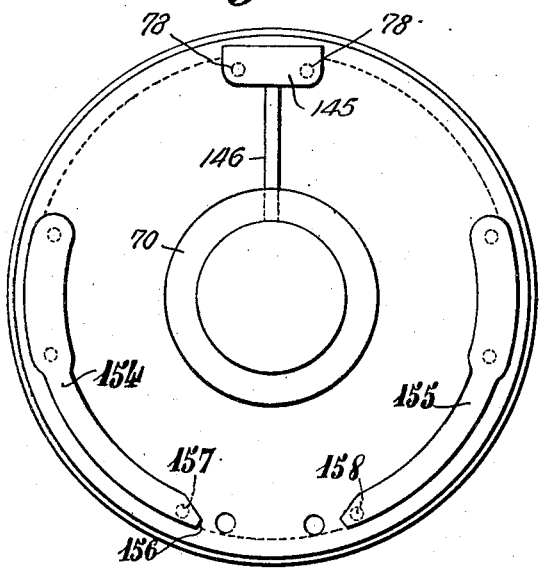

Fig. 19 illustrates a modification in which the valves instead of being constantly obturated by liquid descending by gravity, are covered by a kind of channel 154 and 155 communicating, through an orifice 156, with the lower portions of the compensating tank 87; these orifices can be obturated or not by valves 157 and 158 adapted to prevent the clearing of the tubes 154 and 155 when the level of the liquid in the compensating tank is very low.

The feeding of the cup or cups arranged opposite the orifices or the direct feeding of these orifices (located at the top, or on the side, or at any other place) can be obviously ensured by a direct or indirect communication with one or more of the compartments of the apparatus.

These communications can be internal or external; they might even serve for the evacuation of the air and, in this case they would advantageously be provided at the upper part of the apparatus.

Figure 20:
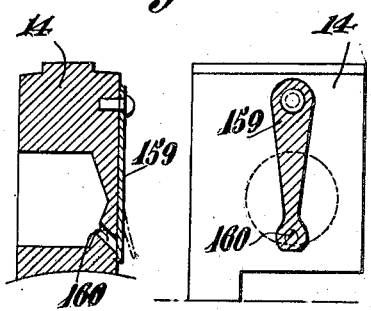
Figure 18:
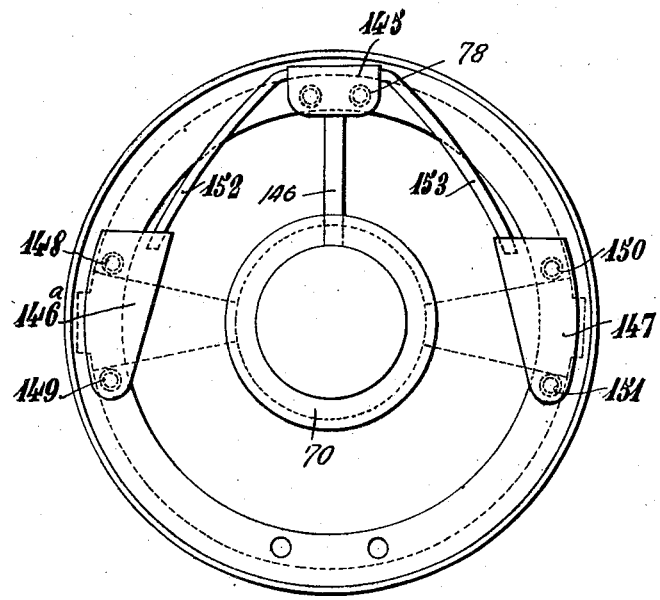

Fig. 20 illustrates a form of construction of the valves which might be provided in the shutter 14; these valves being constituted by small spring plates 159 exactly fitting on the orifice of an oblique channel 160 formed in the shutter; in this way, the liquid which tends to flow away through the oblique channel 160, lifts to the minimum the small plate 159, this diminishing in large proportions the stroke of this plate 159 and, for this reason, the risks of breaking, as well as the length of the vacuum passage which becomes practically negligible.

Instead of employing the typical arrangements described above and illustrated in Fig. 20, one or the other of the following arrangements can be used:

Either that shown in Figs. 21 and 22, in which the hole 160 is formed at right angles to the faces of the shutter, but in which the plate 159 is perforated with one or more holes 161 which, normally do not coincide with the hole 160, but come opposite the same after a slight lifting of the plate 159.

Or that shown in Figs. 23 and 24, in which have been combined the two arrangements: oblique hole 160 (as in Fig. 20) and orifice 161 provided in the plate 159 (as in the Figs. 21 and 22);

Or those illustrated in Figs. 25, 26 and 27, in which the hole is at right angles to the faces of the shutter, but in which one or more longitudinally or transverse notches 162, have been provided in the plates 159, instead of a hole 161.

Or that illustrated in Fig. 28, in which the hole 160 is oblique (as in Fig. 20) and the plate 159 is provided with a notch 162 (as in Figs. 25 to 27).

Or any combinations of these means.

What I claim as my invention and desire to secure by Letters Patent is:

1. In a hydraulic shock absorber, a casing, a movable partition dividing this casing in two chambers of variable volume and having two conduits putting these two chambers in communication, means for automatically obturating one of these conduits for a given direction of displacement of the partition, and means for controlling the two conduits so that the ratio between the sections of passage remains constant.

2. In a hydraulic shock absorber, a casing, a movable partition dividing this casing in two chambers of variable volume and having two conduits putting these two chambers in communication, means for automatically obturating one of these conduits for a given direction of displacement of the partition, an obturator for simultaneously controlling the two conduits, the said obturator being so arranged as to be angularly movable different distances relatively to the two conduits and means for controlling this obturator.

3. In a hydraulic shock absorber, a casing, a movable partition dividing this casing in two chambers of variable volume and having conduits opening on either side of the said partition, means for automatically obturating certain of these conduits for a given direction of displacement of the said partition, an expansible obturator for simultaneously controlling the said conduits, means for determining the expansion or the contraction of the said obturator.

4. In a hydraulic shock absorber, a casing, a movable partition dividing this casing in two chambers of variable volume and having a bored portion within which lead conduits opening on either side of the said partition, means for automatically obturating certain of these conduits for a given direction of displacement of the said partition, a conical expansible obturator arranged within the bored portion for simultaneously controlling the said conduits, means for determining the expansion or the contraction of the said obturator.

5. In a hydraulic shock absorber, a casing, a partition secured to the said casing, a rotary partition, one of the said partitions comprising a central bored portion, in the bore of which open conduits leading on either side of the said partition, means for obturating certain of these conduits for a given direction of rotation of the rotary partition, an expansible obturator arranged in the bore of the central portion, means for determining the expansion or the contraction of the said obturator.

6. In a hydraulic shock absorber, a casing, a partition secured to the said casing, a rotary partition, the said rotary partition comprising a central bored portion, in the bore of which open conduits leading on either side of the said rotary partition, means for obturating certain of these conduits for a given direction of rotation of the said rotary partition, an expansible obturator arranged in the bore of the central portion of the said rotary partition, means for determining the expansion or the contraction of the said obturator.

7. In a hydraulic shock absorber, a casing, a partition secured to the said casing, a rotary partition, the said rotary partition comprising a central bored portion, in the bore of which open conduits leading on either side of the said rotary partition, valves for obturating certain of these conduits for a given direction of displacement of the said rotary partition, an obturator arranged in the bore of the central portion of the said rotary partition, this obturator being constituted by a frusto-conical member slotted in order to be radially expansible, means for determining the expansion or the contraction of the said obturator.

8. In a hydraulic shock absorber, a casing, a partition secured to the said casing, a rotary partition, the said rotary partition comprising a central bored portion, in the bore of which open conduits leading on either side of the said rotary partition, valves for obturating certain of these conduits for a given direction of displacement of the said rotary partition, an obturator arranged in the bore of the central portion of the said rotary partition, this obturator being constituted by a frusto-conical member perforated with a hole terminating in a conical part and slotted in order to be radially expansible, a rod pressing against the conical part terminating the hole formed in the obturator, means for moving the said rod.

9. In a hydraulic shock absorber, a casing, a partition secured to the said casing, a rotary partition, the said rotary partition comprising a central bored portion, in the bore of which open conduits leading on either side of the said rotary partition, valves for obturating certain of these conduits for a given direction of displacement of the said rotary partition, an obturator arranged in the bore of the central portion of the said rotary partition, this obturator being constituted by a frusto-conical member perforated with a hole terminating in a conical part and slotted in order to be radially expansible, a rod pressing against the conical part terminating the hole formed in the obturator and screw threaded at its end for fitting in a corresponding screw threaded portion of the rotary partition.

10. In a hydraulic shock absorber, a casing, a partition secured to the said casing, a rotary partition, the said rotary partition comprising a central bored portion, in the bore of which open conduits leading on either side of the said rotary partition, valves for obturating certain of these conduits for a given direction of displacement of the said rotary partition, an obturator arranged in the bore of the central portion of the said rotary partition, this obturator being constituted by a frusto-conical member perforated with a hole terminating in a conical part and slotted in order to be radially expansible, a rod pressing against the conical part terminating the hole formed in the obturator and screw threaded at its end, a nut for this screw threaded part the said nut having an external cylindrical surface for fitting a corresponding bore of the movable partition, means for securing the said nut in the said bore.

11. In a hydraulic shock absorber, a cylindrical casing, a partition secured to the said casing, a rotary partition in contact with the cylindrical surface of the casing by large surfaces having their edge grooved except at the middle part, a cap for closing the casing, a compensating chamber, ducts formed in the cap for causing the casing to communicate with the compensating chamber, valves arranged in the said ducts.

12. In a hydraulic shock absorber, a cylindrical casing, a fixed partition arranged in the said casing, a movable partition rotating in this casing and dividing the latter, with the fixed partition, in several chambers, means for causing these various chambers to communicate together, a cap for closing the casing and having ducts passing through it, valves for controlling the said ducts, these ducts opening externally in cups, means for automatically ensuring the filling up of the cups.

13. In a hydraulic shock absorber, a casing, a movable partition dividing this casing into two chambers of variable volume and having conduits opening on either side of the said partition, means for automatically obturating certain of these conduits for a given direction of displacement of the said partition, an expansible obturator for simultaneously controlling the said conduits comprising a sleeve with a conical bore, and means for expanding or contracting said obturator including a ball engaging with said conical bore.

14. In a hydraulic shock absorber, a casing, a movable partition dividing this casing into two chambers of variable volume and having conduits opening on either side of the said partition, means for automatically obturating certain of these conduits for a given direction of displacement of the said partition, an expansible obturator for simultaneously controlling the said conduits, comprising a sleeve with a conical bore, and means for expanding or contracting said obturator including a ball engaging with said conical bore, and a longitudinally movable rod arranged in the obturator and engaging said ball.

15. In a hydraulic shock absorber, a working chamber adapted to contain a liquid, a replenishing chamber adapted to contain a supply of liquid which is to be delivered to said working chamber and which is separated from the working chamber by a partition containing a duct, said partition also being provided with a bearing and a cup adjacent to said duct, a piston reciprocating in said working chamber and provided with a shaft journaled in said bearing, and means for automatically filling said cup with liquid including a tube communicating at one end with said bearing and opening at its other end into said cup.

16. A hydraulic shock absorber comprising a working chamber adapted to contain a resistance liquid, a member containing a duct extending from one part of the chamber to another part thereof, and a flat spring valve having a fixed end secured to said member and having a movable end which has an imperforate part adapted to cover said duct, said duct being inclined from the attached end of said valve toward the movable end thereof.

17. A hydraulic shock absorber comprising a working chamber adapted to contain a resistance liquid, a member containing a duct extending from one part of the chamber to another part of the same, and a flat spring valve having a fixed end secured to said member and a movable end which has an imperforate part adapted to cover said duct, and a cut-out in said movable end which is arranged opposite a solid part of said member.

18. A shock absorber comprising a working chamber adapted to contain a resistance liquid; a piston movable back and forth in said working chamber; a replenishing chamber from which liquid is supplied to said working chamber, a partition wall between said chambers containing a vent passage leading from the upper part of said working chamber to the upper part of said replenishing chamber, and a pocket which is arranged at that end of said vent passage which opens into the replenishing chamber and which is adapted to contain a quantity of liquid covering said vent passage and forming a liquid seal for the same.

In testimony whereof I have signed my name to this specification.

MAURICE HOUDAILLE.